United States Patent

Flexman, Jr.

[11] 3,912,699
[45] Oct. 14, 1975

[54] IONOMER COMPOSITIONS

[75] Inventor: Edmund Arthur Flexman, Jr., Wilmington, Del.

[73] Assignee: E. I. Du Pont de Nemours and Company, Wilmington, Del.

[22] Filed: Oct. 17, 1974

[21] Appl. No.: 515,710

[52] U.S. Cl. ........ 260/88.1 PC; 260/42; 260/42.18; 260/80.8
[51] Int. Cl.² ................. C08F 8/32; C08F 222/02
[58] Field of Search .................. 260/88.1 PC, 80.8

[56] References Cited
UNITED STATES PATENTS
3,164,634  1/1965  Bremmer .................. 260/570.5
3,471,460  10/1969  Rees .................... 260/88.1

Primary Examiner—Joseph L. Schofer
Assistant Examiner—John Kight

[57] ABSTRACT

There are disclosed ionomer compositions exhibiting outstanding physical properties (high stiffness, yield strength, hardness, melt index and inherent fire resistance) obtained by neutralization of a homogeneous, random copolymer of ethylene and an α,β-ethylenically unsaturated monocarboxylic acid selected from acrylic acid and methacrylic acid, said random copolymer containing from 5 mole percent to 25 mole percent of the copolymerized monocarboxylic acid, with a diamine having a perhalogenated aromatic nucleus and having the formula H—B—Ar—B—[Ar—B]$_y$H in which B is a diamine diradical selected from the group consisting of aliphatic primary diamines having from 2 to 12 carbon atoms,

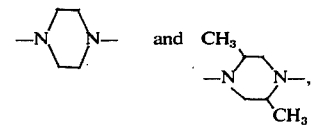

Ar is a perhalogenated aromatic diradical selected from

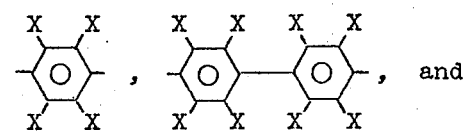

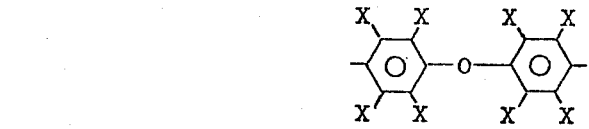

where X is a halogen radical selected from Cl and Br, and y is an integer from 0 to 1 inclusive. Sufficient diamine is employed to neutralize from 10 to 100% of the carboxylic acid groups and, in some cases, an excess over the proportion required by stoichiometry to neutralize 100% of the carboxylic acid groups may be employed. The ethylene-acid copolymer may be a terpolymer containing up to 25 mole % of a third copolymerized monomer which may be a 1-olefin containing 3 to 10 carbon atoms or an α,β-unsaturated carboxylic alkyl ester.

16 Claims, No Drawings

IONOMER COMPOSITIONS

BACKGROUND OF THE INVENTION

1. Field of the Invention

This invention provides a novel class of ionomers, the homogeneous, random ionic copolymers of ethylene with $\alpha,\beta$-unsaturated carboxylic acids at least partially neutralized with a class of complex diamines containing perhalogenated aromatic nuclei, and compositions comprising such ionomers. More particularly, this invention provides such ionomers comprising at least 50 mole percent of ethylene copolymerized with from 5 to 25 mole percent, inclusive, of acrylic or methacrylic acid and neutralized to the extent of 10 to 100% of teh carboxylic acid groups by diamines obtained by reacting a perhalogenated aromatic compound (hexachlorobenzene, decachlorobiphenyl, dechlorodiphenyl ether or the corresponding perbrominated aromatic compounds) with an aliphatic, primary diamine containing 2 to 12 carbons or with piperazine or 2,5-dimethylpiperazine. The ethylene-acid copolymer employed to produce the ionomer may also comprise up to 25 mole percent of other copolymerized monomers including 1-olefins containing from 3 to 10 carbon atoms and $\alpha,\beta$-unsaturated carboxylic alkyl esters. Excess of the perhalogenated aromatic diamines can be incorporated in the ionomers to improve their fireretardancy characteristics.

2. Prior Art

Ionomers which are homogeneous, ionic, random copolymers of ethylene and $\alpha,\beta$-unsaturated carboxylic acids neutralized by reaction with ionized metal salts are disclosed in Rees, U.S. Pat. No. 3,264,272, patented Aug. 2, 1966. As therein disclosed, those metalic ionomers provide transparent plastics which, in the solid state, are crosslinked by ionic crosslinks yet at elevated temperatures, melt and flow, and are melt-fabricable by the customary commercial techniques of injection molding, compression molding and melt extrusion through dies. However, the molten metallic ionomers disclosed in this Rees patent exhibit much lower melt index values than the base ethylene-acid copolymers from which they are prepared. According to this Rees patent, the metallic ionomers exhibit stiffness values (ASTM D-747-58-T) in the range of 15,000 to 49,000 psi and yield strengths in the range of 1,035 to 2,390 psi (ASTM D412-51T).

Ionomers derived from homogeneous, random copolymers of ethylene with $\alpha,\beta$-unsaturated carboxylic acids by neutralization with particular classes of diamines also are disclosed by Rees, inter alia, in U.S. Pat. No. 3,471,460, patented Oct. 7, 1969. According to this patent, this class of ionomers exhibits stiffness values in the range of 13,300 psi (where ethylene diamine was employed to neutralize an ethylene-acid copolymer) to 63,380 psi (where hexamethylene diamine was used to neutralize an ethylene-acid copolymer). Neutralization of an ethylene-acid copolymer with piperazine provided an ionomer having a stiffness of 18,000 psi while neutralization with p-phenylene diamine provided an ionomer having a stiffness of 16,100 psi.

It has also been known to render ethylene-methacrylic acid copolymers fire-resistant by blending in chlorinated biphenyls, but when added in proportions sufficient for this purpose, other physical properties of the ethylene-acid copolymer are substantially impaired.

The reaction of two moles of a diamine with one mole of a chlorinated biphenyl to produce diamines has been described (cf. Bremmer, U.S. Pat. No. 3,164,634). The production of monoamines by reaction of one mole of diamine with one mole of decachlorobiphenyl has also been described (cf. U.S. Pat. No. 3,501,341). Reactions of decachlorobiphenyl in the 4,4'-position are discussed in some detail in an article by Binns and Suschitzky entitled "Polyhalogenoaromatic Compounds, Part XX. Some Reactions of Decachlorobiphenyl" appearing in *J. Chem. Soc.* (c), 1971, pages 1913-1917; the article describes, inter which reacts in an analogous manner to piperazine $(CH_2)_p$-OH in which p is an integer of 1-3, and a solalia, the reaction with the monoamine, piperidine, with decachlorobiphenyl.

OBJECTS OF THE INVENTION

One object of this invention is to provide non-metallic ionomer resins with an exceptional combination of physical properties including high stiffness, yield strength, hardness and melt index.

Another object of this invention is to provide ionomer resins which are inherently fire-resistant without the need to employ additives which generally are detrimental to other physical properties.

Other objects and advantages of this invention will become apparent from the description and examples which follow.

SUMMARY OF THE INVENTION

The objects of the invention are achieved by an ionomer composition comprising, as base resin, a homogeneous, random, high molecular weight copolymer of at least 50 mole percent ethylene with from about 5 to 25 mole percent of an $\alpha,\beta$-ethylenically unsaturated carboxylic acid selected from acrylic acid and methacrylic acid in which from about 10 to 100% of the carboxylic acid groups have been neutralized with a diamine having the structure H—B—Ar—B$\frac{}{}$Ar—B$\frac{}{y}$H in which y is an integer from 0 to 1 inclusive, B is a diamine diradical selected from the group consisting of linear aliphatic diamino diradicals of the structure —NH$\pm$CH$_2)_n$NH— in which n is an integer from 2 to 12 inclusive, branched chain aliphatic diamino diradicals of of the structure $$-NH\text{-}(CH_2)_p\text{-}CH\text{-}(CH_2)_q\text{-}NH-$$
$$\hphantom{-NH\text{-}(CH_2)_p\text{-}}|$$
$$\hphantom{-NH\text{-}(CH_2)_p\text{-}}R$$

in which R is an alkyl group of 1 to 6 carbon atoms, p and q are integers from 1 to 10 and $p+q$ equals an integer from 2 to 11 inclusive, and

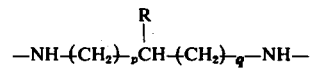
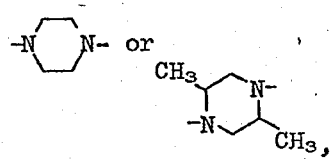

and Ar is a perhalogenated aromatic diradical selected from

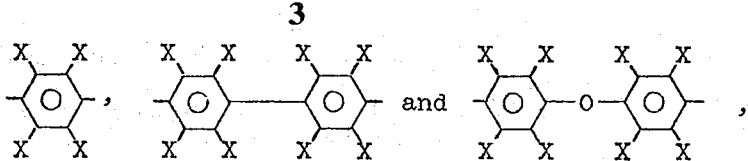

in which X is a halogen radical selected from Cl— and Br—. Optionally an excess of the diamine over the stoichiometric amount required for 100% neutralization may be employed where outstanding fire resistance is desired. Thus compositions of this invention may be prepared using from 10 to 300% of the stoichiometric proportion of diamine, preferably 40 to 200%, based on the carboxylic acid groups in the base resin where optimal physical properties are required. For many uses 50 to 100% of the stoichiometric proportion of diamine is sufficient and preferred, patricularly when maximum fire resistance is not required. Optionally the acid copolymer, prior to neutralization, may be a terpolymer comprising, in addition to copolymerized ethylene and $\alpha, \beta$-unsaturated carboxylic acid, up to 25 mole percent of at least one other copolymerized, unsaturated monomer selected from the 1-olefins having from 3 to 10 carbon atoms, and unsaturated carboxylic esters selected from the group consisting of vinyl acetate, alkyl acrylates and alkyl methacrylates (e.g. methyl acrylate or methyl methacrylate). Ionomers prepared from the diamines derived from perhalogenated biphenyl are preferred in most applications because they are much stiffer.

The term "ionomer" as employed herein describes the ethylene/carboxylic acid copolymer which has been partially or completely neutralized with a diamine base to provide ammonium salts. In this form, the ionic bonds produced provide thermolabile cross-linkages which effect corsslinking in the solid state but which are reversibly broken on melting of the ionomer so that, in the molten state, these ionomers are readily molded or extruded but, thereafter, upon cooling and solidification, return to the crosslinked condition. These novel compositions are characterized in solid, fabricated forms by transparency and resiliency and by exhibiting remarkable, unexpectedly high stiffness, yield strength, hardness and melt index values as compared with either the unneutralized ethylene-acid copolymers or with ionomers of the prior art such as those derived by neutralization of the ethylene-acid copolymers with metal salts as disclosed by Rees in U.S. Pat. No. 3,264,272 patented Aug. 2, 1966 or those derived by neutralization of the ethylene-acid copolymers with any of the diamines disclosed by Rees in U.S. Pat. No. 3,471,460 patented Oct. 7, 1969.

In the preferred case, at least 30% by weight, preferably at least 40 to 50% by weight of a diamine containing a perchlorinated aromatic nucleus, is employed to neutralize the ethylene-acid copolymer. In some cases this proportion is in excess of that required theoretically by stoichiometry for 100% neutralization of the carboxylic acid groups in the ethylene/carboxylic acid copolymer. Such excess is compatible with the ionomer and provides improved fire retardancy without detriment to other physical properties. The resulting ionomers in this preferred case are further characterized by being fire resistant.

The novel ionomer compositions of this invention are, due to their remarkable properties, useful in a variety of plastics applications. They can be fabricated by injection or compression molding into such articles as tool handles, automotive parts, sporting equipment and toys. They can be fabricated by melt-extrusion through dies into coatings on wire or cable or pipe or into strong, transparent packaging film. These ionomers can also be melt-blended and fabricated with carbon black, $TiO_2$ or other pigment fillers and with fibrous fillers such as short glass fibers, fibrous silicas or asbestos to provide exceptionally strong, stiff fire-resistant articles.

DESCRIPTION OF PREFERRED EMBODIMENTS

The ionomers of the present invention are prepared by melt-blending or solution-blending an ethylene/carboxylic acid copolymer with a diamine having a perhalogenated aromatic nucleus. In this process neutralization of a portion or all of the carboxylic acid groups in the ethylene/carboxylic acid copolymer occurs to provide ammonium salts which are ionic in nature. This reaction produces no by-products. If desired, ammonium salts of the diamines may be employed for blending with the ethylene/carboxylic acid copolymer. However, in this case the by-product obtained ($H^+A^-$) from the anion must be one (such as acetic acid) which is readily removed from the ionomer by volatilization or extraction.

More specifically, the reaction of the diamine with the ethylene/carboxylic copolymer is carried out by melt-blending the polymer with the diamine using the various techniques which have been developed in the art. Thus, the materials may be blended on a rubber mill or in the many types of melt-blend mixers which provide working to the blend and which are known in the art. Since the reaction of the diamine with the carboxylic acid groups of the copolymer at the temperatures contemplated does not result in any side product when the diamine itself (as distinguished from its diammonium salt) is employed, this reaction can also be carried out in closed vessels and in particular, it can be carried out in a melt extruder with a mixing section into which the diamine can be injected. In this method of operation, the resulting ionomer may be melt-extruded through a die and cut into molding granules or it may be melt-extruded directly into a final fabricated article such as film or wire coating. In another procedure, the ethylene acid copolymer base resin may be dissolved in a suitable hydrocarbon solvent and then mixed with the diamine or a solution in the same hydrocarbon solvent of the diamine at elevated temperatues. If the reaction is carried out in contact with air, care must be taken that the reaction temperature is not excessively high. If the reaction temperature or the time of exposure to that temperature becomes excessive (i.e., significant time above 200°C.) then the reaction of the diamine with the ethylene/carboxylic acid copolymer might not lead to a diamine-modified ionomer but form instead a crosslinked, intractable resin. The explanation for this result may be that the reaction of the diamine has proceeded beyond the ammonium salt formation and has resulted in the formation of amide structures. It is to be understood, however, that the specific technique employed in forming the ionomer of the present invention is not critical and that various modifications of the techniques above described will be apparent to one skilled in the art.

The ethylene/carboxylic acid copolymer or terpolymer employed as the base resin for reaction with the diamine to provide the ionomers of the present invention is a homogeneous random copolymer obtained by the copolymerization of a mixture of the ethylene and the unsaturated carboxylic acid monomers. In a preferred process, a mixture of the two monomers is introduced into a polymerization zone in a polymerization reactor maintained under constant environment conditions (free from concentration gradients) by vigorous end-to-end mixing and by the continuous addition of the monomers, solvents, and catalysts, and continuous removal of the copolymer, solvent, and unreacted monomers. Suitable conditions for the copolymerization in the polymerization zone are pressures of 50 to 3,000 atm., temperatures in the range of 150° to 300°C., and the presence of free-radical producing polymerization initiators such as peroxides and diazo compounds, as is known in the art. The inert solvent for the system may be an aliphatic, cycloaliphatic, or aromatic hydrocarbon, although it is possible to conduct the polymerization in the substantial absence of added inert solvents. In the case where terpolymers are to be employed as the base resin, the mixture of monomers added to the reactor will include the third comonomer, that is, a higher 1-olefin or an $\alpha$, $\beta$-unsaturated carboxylic acid ester.

While the ethylene content of the copolymer must be at least 50 mole percent, up to 25 mole percent of a termonomer may be incorporated in the copolymer. Since the acrylic acid or methacrylic acid employed as the acid comonomer is more readily polymerized by free-radicals than ethylene, its concentration in the mixture of monomers should be less than the concentration desired in the finished copolymer. The relative reaction rates for polymerization of ethylene and of methacrylic or acrylic acid in the presence of free radicals are well known and can be used to determine the concentration of unsaturated acid monomer to be employed in the polymerization. As a third comonomer, there may be employed, for instance, propylene, butene, octene, decene, methyl methacrylate, methyl acrylate, ethyl methacrylate, ethyl acrylate, vinyl acetate, vinyl chloride, vinylidene chloride or vinylidene fluoride.

The use of a continuous, constant environment, stirred reactor for conducting the copolymerization will ensure that the copolymer or terpolymer products are homogeneous and that the acid groups are randomly distributed throughout the macromolecular chains.

The ethylene/carboxylic acid copolymers or terpolymers employed as the base resins for producing the ionomers of the present invention may also be prepared by the copolymerization of ethylene with an $\alpha$, $\beta$-ethylenically unsaturated carboxylic alkyl ester selected from the group consisting of the n-alkyl esters of acrylic acid and methacrylic acid; preferably methyl or ethyl esters are employed, although esters containing longer-chain n-alkyl groups are also operable. Thus the alkyl group of the ester may contain up to 12 carbon atoms and comprise any of methyl, ethyl, propyl, butyl, isobutyl, pentyl, hexyl, heptyloctyl, isooctyl, nonyl, decyl, dodecyl and the like. Subsequent to the copolymerization, which again should be conducted under constant environment conditions in a stirred reactor, the ethylene ester copolymers can then be reacted either completely or in part to form free carboxylic acid groups by hydrolysis, saponification, or pyrolysis. If only a portion of the ester groups are thus converted to carboxylic acid groups, the resultant product will have the composition of a terpolymer.

The ethylene/carboxylic acid copolymers or terpolymers employed as the base resins to form the ionomers of the present invention are preferably of high molecular weight in order to achieve the outstanding physical properties obtainable with the ionomers of the present invention. The molecular weight of a copolymer useful as a base resin in producing the ionomers of the present invention is most suitably defined by melt index, a measure of melt viscosity, described in detail in ASTM-D-1238-57T. Thus, copolymers employed for producing the ionomers of the present invention by reaction with the diamine containing a perhalogenated aromatic nucleus should preferably exhibit a melt index in the range of 0.1 to 100 g./10 minutes and, in the more preferred cases, in the range of 1.0 to 20 g./10 minutes.

The diamines containing a perhalogenated aromatic nucleus which are employed for reaction with the ethyleneacid copolymers to produce the ionomers of the present invention are readily obtained by heating together at elevated temperatures, hexahalobenzene, decahalobiphenyl or decahalodiphenyl ether (in each case, the halogen may be either chloride or bromide radicals) with an aliphatic diamine containing from 2 to 12 carbon atoms, such as ethylene diamine, hexamethylene diamine, or decamethylene diamine, or the heterocyclic diamines, piperazine or 2,5-dimethyl piperazine may be employed as the diamine. The ingredients should be heated together, optionally in a solvent, at temperatures above 100°C., generally under reflux and under a nitrogen atmosphere for a time sufficient to complete the reaction. An excess of diamine can be used to react with the HCl or HBr formed or a metallic base, such as CaO, can be used for this purpose. The latter is required where it is desired to produce products such as (DCBP)$_2$(HMD)$_3$, since the stoichiometry of reactants must be correct to produce such products.

The diamine products can be isolated by precipitation in hot water and washed with hot water and dried in a vacuum oven, and used without further purification in most cases, although if desired, fractional distillation under reduced pressure or recrystallization from solvents may be employed to obtain highly-purified samples of the diamine. The following list shows some specific examples of comparable diamines by formula and a code abbreviation which will be employed hereinafter in referring to such diamines:

| FORMULA | CODE ABBREVIATION AND NAME |
|---|---|
| 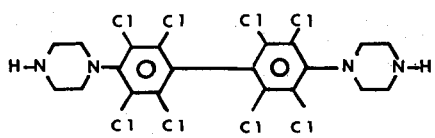 | DCBP/Pip$_2$<br>4,4'-di[piperazino]octachlorobiphenyl |
| 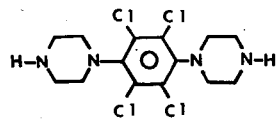 | HCB/Pip$_2$<br>1,4-di[piperazino]tetrachlorobenzene |
| 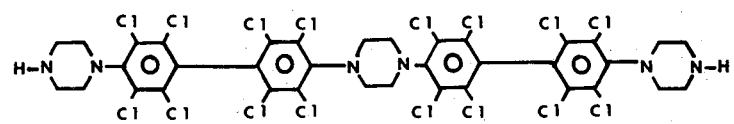 | (DCBP)$_2$/Pip$_3$<br>N,N'-bis(4'-piperazinooctachlorobiphenyl)piperazine |
| 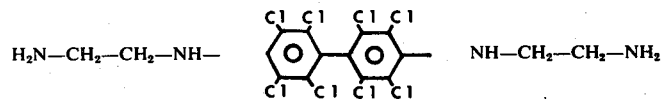 | DCBP/(EDA)$_2$<br>4,4'-di[ethylenediamino]-octachlorobiphenyl |
| 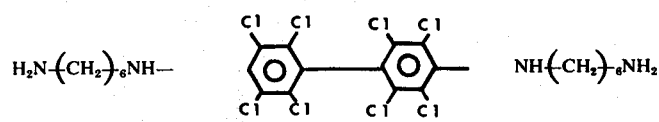 | 4,4'-di[hexamethylenediamino]octachlorobiphenyl |
| 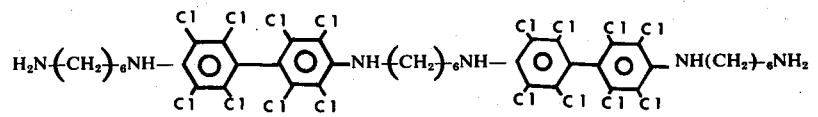 | (DCBP)$_2$/(HMD)$_3$<br>N,N'-bis(4'-omega-aminohexamethyleneaminooctachlorobiphenyl)1,6-diaminohexane |
| 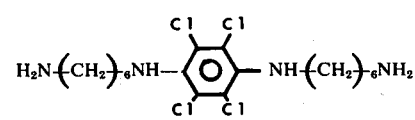 | HCB/(HMD)$_2$<br>1,4-(hexamethylenediamino)tetrachlorobenzene |
| 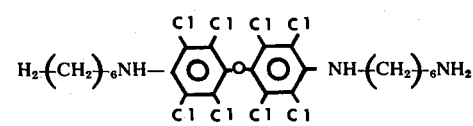 | DCBPE/(HMD)$_2$<br>4,4'-di[hexamethylenediamino]octachlorodiphenyl ether |
| 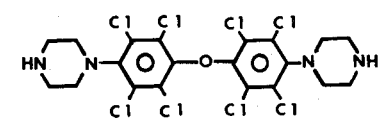 | DCBPE/Pip$_2$<br>4,4'-di[piperazino]-octachlorodiphenyl ether |

THE BROMINE ANALOGUES OF ANY OF THE ABOVE ARE ALSO CONTEMPLATED.

As can be seen from the structure of the diamine products obtained, this structure can either contain one or two perhalogenated nuclei, depending on the proportions of perhalogenated aromatic substance and diamine employed in the raction. The by-product of the reaction, hydrogen halide, can be removed by washing with a strong aqueous base such as aqueous sodium hydroxide. Otherwise, the ammonium halide salts are obtained. Because of the corrosive nature of hydrogen halides, it is generally preferable to remove this by-product from the product mixture.

The following examples are presented to further illustrate the invention but without any intention to limit the scope of the invention thereto, since the scope of the invention is as described hereinabove and hereinafter claimed. Obvious modifications of the examples will be apparent to one of skill in the art. The ethylene/carboxylic acid copolymers employed as base resins in the examples were obtained by direct copolymerization under constant environment conditions as hereinabove described.

Plaques were compression-molded from each of the three products and tested for physical properties, with the results shown in Table I.

TABLE I

| Example | Weight % DCBP/Pip$_2$ | % COOH Neutralized[1] | Yield Strength[2] (psi) | Tensile Strength[2] (psi) | Elongation[2] | Tensile Modulus[2] (psi) | Stiffness[3] (psi) | Melt Index[4] (gm/10 min.) | Shore Hardness |
|---|---|---|---|---|---|---|---|---|---|
| 1 | 30 | 80 | 3840 | 4900 | 370 | 141,000 | 92,100 | 10 | — |
| 2 | 40 | 126 | 3910 | 3940 | 270 | 150,000 | 122,000 | 17 | 80 |
| 3 | 50 | 186 | 1460[8] | 1416[8] | 1 | 162,000 | 139,000 | 33 | — |
| Na$^+$ Ionomer A[6] | — | 54 | 2330 | 5090 | 346 | — | 55,000 | 0.9 | 68 |
| Zn$^{++}$ Ionomer B[7] | — | 17 | 1870 | 2850 | 471 | — | 22,910 | 5.0 | 57 |

NOTES:
[1] Theoretical calculation assuming DCBP/Pip$_2$ of 100% purity.
[2] ASTM D-1708.
[3] ASTM D-747.
[4] ASTM D-1238.
[5] ASTM D-785.
[6] Sodium ionomer A is shown for comparison. It is a commercial product based on an ethylene/methacrylic acid copolymer base resin containing 15% by weight copolymerized methacrylic acid which has been neutralized with NaOH to the extent of 54% of the carboxylic acid groups. The melt index of the acid copolymer base resin was 60 g./min. [SURLYN Ionomer 1707].
[7] Zinc ionomer B is shown for comparison. It is a commercial product based on an ethylene/methacrylic acid copolymer base resin containing 87% by weight copolymerized methacrylic acid which has been neutralized with zinc acetate to the extent of 17% of the carboxylic acid groups [SURLYN Ionomer 1652].
[8] The low values for this property are due to the low % elongation of this sample.

EXAMPLES 1–3

1,4-Di[piperazineo]octachlorobiphenyl, a diamine containing a perchlorinated aromatic nucleus, (DCBP/Pip$_2$), was prepared by heating together in a round-bottom flask, equipped with a reflux condenser and blanketed with nitrogen, 100 g. (0.2 mole) of decachlorobiphenyl and 250 g. (2.9 moles) of piperazine at 140°C. for 5 hours. At the end of this time, the crude DCBP/Pip$_2$ was isolated by precipitation in hot water. Excess piperazine and piperazine hydrochloride were removed by washing 4 times with hot water. The product was dried in a vacuum oven overnight and used with no further purification. The melting point of this crude DCBP/Pip$_2$ was 115°–120°C. This crude DCBP/Pip$_2$ contained some mono-substituted reaction product of DCBP. Its analysis was: % N, 7.72, 7.61 (calc. 9.36); % C, 38.03, 38.12 (calc. 40.0); % H, 2.58, 2.62 (calc. 3.01); % Cl, 51.11, 51.13 (calc. 47.5). The presence of some mono-substituted product is indicated from the analysis.

Three ionomers were prepared from the crude DCBP/Pip$_2$ prepared as described above by reacting 30%, 40%, and 50% by weight, respectively, of the DCBP/Pip$_2$ prepared as described above with an ethylene/methacrylic acid copolymer containing 84.8% by weight copolymerized ethylene and 15.2% by weight copolymerized methacrylic acid. The melt index of this ethylene/methacrylic acid copolymer was 6 g./10 minutes. The ethylene/methacrylic acid was melted at 100°C. on a Brabender Plastograph, using roller blades operating at 40 rpm under a nitrogen atmosphere. The DCBP/Pip$_2$ was then added to the melted ethylene acid copolymer and the mixture blended together for 15 minutes at 100°C. to bring about the neutralization reaction.

The products of Examples 1, 2 and 3 were also examined for fire-retardancy or flame resistance. Since it is well known that the burning of polyolefin-type compositions is quite dependent upon sample size and configuration, upon the surroundings such as drafts, and upon the geometric relationship of the sample and the flame, it should be understood that fire retardancy is a relative term which has significance only with reference to specific sets of tests and conditions. Several ASTM and Underwriters' Laboratory tests have been established with specific conditions that are commonly used to determine the fire-retardancy of various materials. The horizontal bar test employed (ASTM-635-68) is conducted with 1/16-inch by ⅝-inch bars. The sample bars are supported horizontally at one end. A gas flame is placed under the free end of the bar for 30 seconds for each material; 10 sample bars are employed and if none of the 10 specimens burn for 4 inches, the material is considered self-extinguishing (SE) by the test. The average time to self-extinguish is measured and reported. If only one of the samples burns more than 4 inches, 10 additional samples are tested. If two or more of the 20 samples burn more than 4 inches, the material is said to be burning (B) by this test, and the average burning rate of the samples which burned is reported.

Some of the samples were also tested by a modification of the ASTM-568 vertical film test. This is a vertical burn test for thin plastic sheets (less than 50 mils) which calls for the use of three samples 18 inches by 1 inch with gauge marks 3 inches from each end. In a modification of that procedure used for these tests, the samples were 11–12 mils thick, 8 inches long and 1 inch wide laminated onto ¾ mil aluminum foil. A mark was made 3 inches from the bottom and the samples hung vertically in a burning chamber. A 1 inch blue flame from a Bunsen burner was used to ignite the samples for 15 seconds, and then withdrawn. If the sample does not ignite within 15 seconds, the material is considered non-burning (NB) but if the sample ignites but extinguishes prior to reaching the top gauge mark, it is rated as self-extinguishing (SE). In cases where the sample ignites but then is self-extinguished, it is said to be a self-extinguishing rating (SE). The results obtained are shown in Table II for the horizontal bar test and in Table III for the vertical film test.

TABLE II

| EX. | WT. % DCBP/Pip₂ | HORIZONTAL BAR TEST BURNING TIME | | RATING[1] |
|---|---|---|---|---|
| | | FIRST IGNITION | SECOND IGNITION | |
| 1 | 30 | 3 sec. | 22 sec. | |
| | | 5 sec. | 16 sec. | SE-2 |
| 2 | 40 | 0 sec. | 20 sec. | |
| | | 8 sec. | 30 sec. | SE-2 |
| 3 | 50 | 1 sec. | 14 sec. | |
| | | 1 sec. | 3 sec. | SE-2 |
| Metallic Ionomers | — | — | — | B |

[1] Underwriter's Laboratory Rating.

TABLE III

| EX. | WT. % DCBP/Pip₂ | VERTICAL FILM TEST[1] BURNING TIME | BURNING DISTANCE | RATING[2] |
|---|---|---|---|---|
| 2 | 40 | 12 sec. | 3″ | NB |
| 1 | 30 | 22 sec. | 3½″ | SE |
| | | 45 sec. | 6″ | — |

[1] Samples laminated onto 3/4 mil aluminum foil by pressing at 140°C. for 2 minutes. Specimen 8″ long, 1″ wide and 11–12 mils thick.
[2] UL Rating.

Controls prepared from the ethylene methacrylic acid base resin copolymer and from metal ionomers derived therefrom burned the entire 8 inches in 36 to 43 seconds, and are therefore rated as burning (B).

EXAMPLE 4

The DCBP/Pip₂ prepared as described in Examples 1–3 was further purified by recrystallization by dissolving the crude product in hot benzene, adding a small amount of ethanol, and heating to take off the water as an ethanol azeotrope, and then removing most of the benzene in boiling heptane. After cooling and recovery of the solid, purified DCBP/Pip₂, the purified diamine had a melting point of 223°–233°C., although its infrared spectrum was identical with that of the crude material melting at 100°–120°C. While elemental analysis indicated that the mono-substituted material was present in the crude, low-melting sample, this refined product gave the following analysis: % N, 9.26, 9.18; % C, 40.69, 40.36; % H, 3.29, 3.23; % Cl, 48.04, 46.98. This good conformity with theory indicates that the refined product is of good purity.

Following the procedure of Example 2, the purified DCBP/Pip₂ was blended into the same ethylene/methacrylic acid base copolymer at the 40% by weight level as in Example 2 by the same procedure except that the blending temperature was increased to 200°C. because of the higher melting point of the diamine. The blended, neutralized (126% of stoichiometrical theory) ionomer was transparent on cooling and retained its transparency on compression molding at 140°C. The physical properties of the ionomer of this example were determined in the same manner as for the products of Examples 1, 2 and 3 with the following results:
Yield strength, 3690 psi;
Tensile strength, 3810 psi;
% Elongation, 110%;
Tensile modulus, 139,000 psi;
Melt index, 11 g./10 minutes.

EXAMPLE 5

4,4′-Di[ethylenediamino]octachlorobiphenyl, DCBP/(EDA)₂, was prepared by heating 500 g. of ethylene diamine dissolved in 2 liters of hexamethylphosphoramide at 120°C. under a nitrogen atmosphere in a round-bottom flask with a reflux condenser. DCBP was added to the above solution in five 200 g. batches and the solution heated to 180°–210°for 4 hours. The reaction product in solution was poured into an open beaker with a nitrogen sparge to remove excess ethylene diamine, 50 ml. of hydrazine was added, as an antioxidant. The DCBP/EDA₂ was isolated by precipitation by pouring into 10 volumes of water and washed 10 times with water until the water was neutral. The solid DCBP/EDA₂ was dried in a vacuum oven. The crude product had a melting point of 110°–117°C. Its elemental analysis was as follows: % N, 9.76, 10.06 (calc. 10.27); % C, 38.51, 38.41 (calc. 35.1); % H, 3.07, 3.12 (calc. 2.56); % Cl, 47.64, 47.58 (calc. 51.9). This product was reacted with the ethylene/methacrylic acid copolymer base employed in the previous examples by the procedure of Examples 1, 2 and 3, employing the Brabender Plastograph, at 100°C.; 40% by weight of the DCBP/EDA₂ was used. The proportion of diamine present was 114% of the stoichiometric amount to provide theoretical 100% neutralization. The physical properties of this ionomer were measured on molded plaques as previously described and are set forth in Table IV.

TABLE IV

| Ex. No. | Diamine Employed To Produce Ionomer | Wt. % Diamine (1) | % COOH Neutralized (1) | Yield Strength (2) (psi) | Tensile Strength (2) (psi) | % Elongation (2) | Stiffness (3) (psi) | Shore D Hardness (4) | Melt Index (5) gm/10 min | 66 PSI HDT (6) |
|---|---|---|---|---|---|---|---|---|---|---|
| 5 | DCBP/(EDA)₂ | 40 | 134 | 3900 | 3800 | 240 | 133,000 | 78 | 15 | 51°C. |
| 6 | DCBP/(HMD)₂ | 40 | 114 | 3700 | 4300 | 310 | 93,600 | 76 | 12 | 47°C. |
| 7 | (DCBP)₂/(HMD)₃ | 30 | 40 | 2700 | 4390 | 350 | — | — | — | — |
| 8 | (DCBP)₂/(HMD)₃ | 40 | 60 | 3140 | 3140 | 174 | 81,000 | 76 | — | 49°C. |
| 9 | (DCBP)₂/(HMD)₃ | 50 | 94 | 3980 | 3270 | 150 | 108,000 | — | — | — |
| 10 | HCB/(HMD)₂ | 40 | 166 | 2480 | 3780 | 330 | 39,000 | 75 | — | — |

NOTES:
(1) Wt. % diamine added to homogeneous random E/MAA copolymer containing 15% by weight copolymerized methacrylic acid. The % neutralized is calculated assuming 100% purity of diamine.
(2) ASTM D-1708.
(3) ASTM D-747.
(4) ASTM D-785.
(5) ASTM D-1238.
(6) Heat distortion temperature, ASTM D-648.

EXAMPLE 6

DCBP/(HMD)₂ was prepared by heating 450 g. (4 moles) HMD to 150°C. under nitrogen in a round-bottom flask equipped with a reflux condenser. 100 g. of DCBP was added in twenty 5 g. batches (0.2 mole total) at 5-minute intervals. After stirring at 150°C. for 3 hours after the final addition, the solution was poured into ice water containing 30 g. of KOH. The viscous product was further purified by dissolving in tetrahydrofuran and precipitating in water. This procedure was repeated 4 times. The product was then dried in a vacuum oven at 100°C. overnight. The DCBP/(HMD)₂ was a viscous liquid which was subjected to elemental analysis: % N, 8.43, 8.51 (8.50 calc.); % C, 44.23, 44.41 (43.75 calc.); % H, 4.99, 4.91 (4.56 calc.); and % Cl, 41.95, 41.92 (43.00 calc.). An ionomer was prepared as described in the previous example by blending 40% by weight of the DCBP/(HMD)₂ with the same ethylene methacrylic acid copolymer as employed in the previous example following the procedure of Example 5. The physical properties of the ionomer are set forth in Table IV.

EXAMPLES 7–9

(DCBP)₂/(HMD)₃ was prepared in a 1 liter, round bottom flask fitted with a reflux condenser. To the flask there were charged 99.7 g. decachlorobiphenyl (0.24 mole), 34.9 g. hexamethylene diamine (0.3 mole), 16.8 g. calcium oxide (0.3 mole) and as solvent, 300 ml. dimethylacetamide. This mixture of reactants and solvent was stirred while heating at reflux under an atmosphere of N₂ for 4 hours and then filtered while hot. The diamine product was precipitated by pouring the filtrate into excess water, collected by filtration and dried under vacuum. The diamine [(DCBP)₂/HMD)₃]was purified by dissolving it in tetrahydrofuran with subsequent addition of water to the solution. The solid, purified (DCBP)₂/(HMD)₃ was recoverd and washed three times with water and then dried under vacuum. It exhibited a softening point of 105°C. and gave the following elemental analysis: % N, 6.27, 6.57 (7.0 calc.); % C, 41.34, 41.34 (42.0 calc.); % H, 3.54, 3.39 (3.67 calc.); and % Cl, 48.11 48.08 (47.3 calc.).

Ionomers were prepared from the DCBP₂/(HMD)₃ by blending 30%, 40%, and 50% by weight respectively with the same ethylene/methacrylic acid as employed in the previous examples, following the procedure of Example 1. The physical properties of these ionomers are set forth in Table IV.

EXAMPLE 10

1,4-Di[hexamethylenediamino]tetrachlorobenzene, HCB/(HMD)₂, was prepared by reacting hexachlorobenzene with hexamethylenediamine following the precedure of Example 6. Elemental analysis of this crude product was as follows: % N, 14.04, 14.02 (12.6 calc.); % C, 54.57, 54.61 (48.6 calc.); % H, 8.11, 7.82 (6.75 calc.); % Cl, 22.76, 22.15 (32.0 calc.). The somewhat high N and low Cl suggest that some trisubstitution of HMD on the HCB may have occured. An ionomer was prepared from the same ethylene/methacrylic acid base polymer as employed in the previous examples, by blending 40% by weight of the HCB/(HMD)₂ with the acid copolymer. The properties of the acid copolymer are shown in Table IV.

With the exception of the ionomer prepared from DCBP/(EDA)₂ (Example 5), all of the ionomers described in the above example were highly transparent in molded form.

In order to compare the physical properties of the novel ionomers of this invention with ionomers prepared from other types of diamines, the same ethylene/methacrylic acid as employed in the above examples was neutralized by addition of 40% by weight of the following three diamines, following the procedures of the above examples, and the resultant ionomers tested for physical properties:

a. piperazine
b. 1,3-di(4-piperidyl)propane and
c. the reaction product of decachlorobiphenyl with N,N-dimethylpropylenediamine.

The resultant ionomers were again molded as in the prior examples and tested for physical properties with the results shown in Table V.

TABLE V

IONOMERS⁽¹⁾ PREPARED FROM OTHER DIAMINES FOR COMPARISON

| DIAMINE EMPLOYED TO NEUTRALIZE E/MMA COPOLYMER | WT. % DIAMINE | % COOH NEUTRALIZED | YIELD STRENGTH (2) (psi) | TENSILE STRENGTH (2) (psi) | % ELONGATION (2) | STIFFNESS (3) (psi) |
|---|---|---|---|---|---|---|
| A. Piperazine | 40 | 860 | 1100 | 4000 | 470 | 13,800 |
| B. HN⟨ ⟩—(CH₂)₃—⟨ ⟩NH 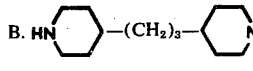 | 40 | 352 | — | — | — | Too limp to test. |
| C. DCBP/(Me₂N—(CH₂)₃—NH₂)₂ | 40 | 118 | — | — | — | Too limp to test. |
| D. E/MAA⁽¹⁾ Control | 0 | — | 1300 | 3000-4000 | 340 | 22,900 |

NOTES:
⁽¹⁾The E/MAA copolymer employed as base resin was a homogeneous, random copolymer containing 15% by weight copolymerized methacrylic acid.
(2)ASTM D-1708.
(3)ASTM D-747.

Also shown in Table V is a control comprising the ethylene/methacrylic acid homogeneous random copolymer which has not been converted to an ionomer by reaction with a diamine. It is noteworthy that ionomers prepared with the diamines B or C are too limp to be tested for stiffness in the physical test procedure, and even the ionomer prepared using piperazine is significantly less stiff than the ethylene/methacrylic acid control. This is in sharp contrast to the ionomers of the present invention which exhibit yield strengths from 2 to 3 times greater than that of the control and dramatically improved stiffness over the stiffness of the control. These superior physical properties make the ionomers of the present invention particularly useful in many plastics appplications such as films, coatings on substrates, pipe, and wire coatings. In addition, the ionomers of the present invention provide the degree of fire retardancy which is, in the cases where at least 40% by weight of the diamine has been employed in the neutralization reaction, sufficient to provide ionomers exhibiting improved fire-retardant properties as compared with ionomers of the prior art.

The novel ionomers of this invention can be blended with high loadings of fillers such as carbon black, short glass fibers, kaolins, or wollastonite ($CaSiO_3$) to provide compositions which can be injection-molded or extruded into articles of high stiffness.

EXAMPLE 11

The ionomer of Example 2 in which the ethylene/methacrylic acid has been neutralized with 40% by weight of DCBP/Pip$_2$ was mixed on a rubber mill with 50% and 70% by weight wollastonite. Bars molded from these compositions were tested for physical properties with the results shown in Table VI.

TABLE VI

| | FILLED IONOMER[1] FROM E/MAA - DCBP/Pip$_2$ | | |
|---|---|---|---|
| | CONTROL NO FILLER | 50 WT. % WOLLASTONITE P-4 | 70 WT. % WOLLASTONITE P-4 |
| Yield Strength[2] (psi) | 4560 | 4170 | 4790 |
| Tensile Strength[2] (psi) | 4750 | 4170 | 4830 |
| % Elongation[2] | 340 | 7.9 | 2.8 |
| Tensile Modulus[2] (psi) | 158,000 | 430,000 | 833,000 |
| Stiffness[3] (psi) | 149,000 | 796,000 | 1,210,000 |
| Flex Modulus[4] (psi) | 138,000 | 459,000 | 900,000 |
| Notched Izod[5] (inch pounds/in$^2$) | 0.87 | 0.60 | 0.44 |
| Hardness, Shore D[6] | 77 | 82 | 88 |
| 66 psi HDT[7] (°C.) | 45 | 50 | 54 |
| Vicat Temp.[8] (°C.) | 63 | 84 | 95 |
| Melt Index[9] (g./10 min.) | 16 | 2.7 | 0.61 |

NOTES
[1]Homogeneous random copolymer of ethylene and methacrylic acid containing 15% by weight copolymerized methacrylic acid neutralized with 40% by weight DCBP/Pip$_2$.
[2]ASTM D-1708
[3]ASTM D-747
[4]ASTM D-760
[5]ASTM D-256
[6]ASTM-785
[7]ASTM D-648
[8]ASTM D-1525
[9]ASTM D-1238.

It should be noted, however, that the flame-retardancy characteristics of the ionomers may be seriously impaired by certain fillers. Where desired, improved flame resistance may be imparted to the filled compositions by the addition of 1–5% of antimony oxide.

I claim:
1. An ionomer composition comprising a homogeneous, random, high molecular weight base resin copolymer compound of at least 50 mole percent copolymerized ethylene and complementally from about 5 to 25 mole percent of a copolymerized α, β-ethylenically unsaturated monocarboxylic acid, selected from the group consisting of acrylic acid and methacrylic acid, and from 0 to 25 mole percent of a copolymerized third monomer, selected from the group consisting of 1-olefins having from 3 to 10 carbon atoms, vinyl acetate, alkyl acrylates and alkyl methacrylates, in which from about 10 percent to 100 percent of the carboxylic acid groups have been neutralized by reaction with from 10 to about 300% of the stoichiometric proportion required for neutralization of the carboxylic acid groups in the base resin of a diamine having the structure

in which $y$ is an integer from 0 to 1 inclusive, B is a diamine diradical selected from the group consisting of linear aliphatic diaminodiradicals of the structure —NH—(CH$_2$)$_n$NH—, where $n$ is an integer from 2 to 12 inclusive, branched chain, aliphatic diamino diradicals of the structure

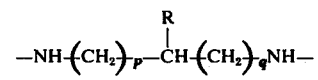

in which R is an alkyl radical of 1 to 6 carbon atoms, inclusive, $p$ and $q$ are integers from 1 to 10, inclusive, and the sum of $p + q$ is an integer from 2 to 11, inclusive, and piperazino diradicals of the structure

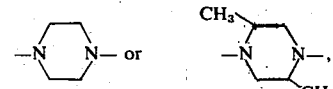

and Ar is a perhalogenated aromatic diradical selected from the group consisting of

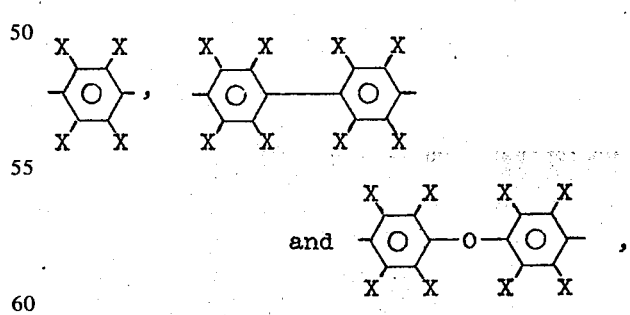

in which X is a halogen radical selected form Cl— and Br—.

2. An ionomer composition according to Claim 1 in which from 40 to 200% of the stoichiometric proportion of diamine required for neutralization of the carboxylic acid groups in the base resin is employed.

3. An ionomer composition according to claim 1 in which from 50 to 100% of the stoichiometric proportion of diamine required for neutralization of the carboxylic acid groups in the base resin is employed.

4. An ionomer composition according to claim 1 in which the base resin comprises at least 75 mole percent copolymerized ethylene.

5. An ionomer composition according to claim 1 in which the α,β-unsaturated carboxylic acid of the base resin is methacrylic acid.

6. An ionomer composition according to claim 5 in which the copolymerized monomers of the base resin consist solely of ethylene and methacrylic acid.

7. An ionomer composition according to claim 1 in which the perhalogenated aromatic diradical is

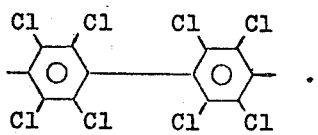

8. An ionomer composition comprising a homogeneous, random, high molecular weight base resin copolymer compound of from 75 to 95 mole percent copolymerized ethylene and complementally from 25 to 5 mole percent copolymerized methacrylic acid in which from about 40 percent to 100 percent of the carboxylic acid groups have been neutralized by reaction with from 40 to 200% of the stoichiometric proportion required for neutralization of the carboxylic acid groups in the base resin of a diamine having the structure

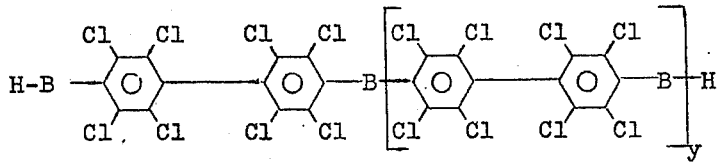

in which $y$ is an integer from 0 to 1 inclusive, and B is a diamino diradical selected from the group consisting of linear aliphatic diamino diradicals of the structure —NH—(CH$_2$)$_n$NH, where $n$ is an integer from 2 to 12 inclusive, and piperazino diradicals of the structure

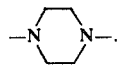

9. An ionomer composition of claim 8 in which from 50 to 100% of the stoichiometric proportion of diamine required for neutralization of the carboxylic acid groups in the base resin is employed.

10. An ionomer composition according to claim 8 in which the diamino diradical is

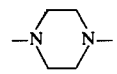

and $y$ is zero.

11. An ionomer composition according to claim 8 in which the diamino diradical is —NH—(CH$_2$)$_6$NH— and $y$ is zero.

12. An ionomer composition according to claim 8 in which the diamino diradical is —NH—(CH$_2$)$_2$NH— and $y$ is zero.

13. A filled composition comprising an ionomer composition of claim 1 intimately blended with a solid, particulate, inert inorganic substance.

14. An ionomer composition comprising a homogeneous, random, high molecular weight base resin copolymer composed of from 75 to 95 mole percent copolymerized ethylene and complementally from 25 to 5 mole percent copolymerized methacrylic acid in which from about 40 to 100% of the carboxylic acid groups have been neutralized by reaction with 40 to 200% of the stoichiometric proportion required for neutralization of the carboxylic acid groups in the base resin of a diamine having the structure

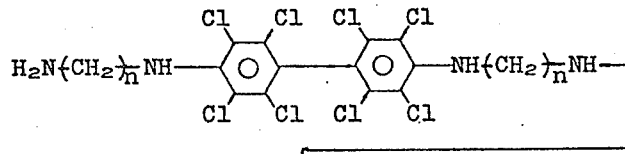
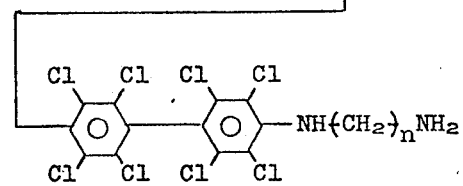

in which $n$ is an integer from 2 to 12 inclusive.

15. An ionomer composition of claim 14 in which $n$ is six.

16. An ionomer composition of claim 14 in which from 50 to 100% of the stoichiometric proportion of diamine required for neutralization of the carboxylic acid groups in the base resin is employed.

* * * * *